(12) United States Patent
Roeder et al.

(10) Patent No.: US 7,557,714 B2
(45) Date of Patent: Jul. 7, 2009

(54) PALLET JACK ANTENNA FOR RFID SYSTEM

(75) Inventors: William H. Roeder, Norcross, GA (US); Donald L. Runyon, Duluth, GA (US); Richard W. Sorenson, Jr., Atlanta, GA (US); Michael Sayre Clott, Marietta, GA (US)

(73) Assignee: EMS Technologies, Inc., Norcross, GA (US)

( * ) Notice: Subject to any disclaimer, the term of this patent is extended or adjusted under 35 U.S.C. 154(b) by 108 days.

(21) Appl. No.: 11/433,556

(22) Filed: May 15, 2006

(65) Prior Publication Data

US 2006/0255949 A1      Nov. 16, 2006

Related U.S. Application Data

(60) Provisional application No. 60/718,947, filed on Sep. 20, 2005, provisional application No. 60/680,925, filed on May 13, 2005.

(51) Int. Cl.
*G08B 13/14*     (2006.01)
(52) U.S. Cl. .............. 340/572.7; 340/572.8; 340/572.1; 343/700 R; 343/711; 343/712; 343/720
(58) Field of Classification Search .............. 340/572.7, 340/572.1, 572.8; 343/700 R, 711, 712, 343/720
See application file for complete search history.

(56) References Cited

U.S. PATENT DOCUMENTS

| | | | |
|---|---|---|---|
| 5,604,485 A * | 2/1997 | Lauro et al. ............... | 340/572.5 |
| 5,608,417 A * | 3/1997 | de Vall ........................ | 343/895 |
| 5,729,697 A | 3/1998 | Schkolnick et al. | |
| 6,057,765 A | 5/2000 | Jones et al. | |
| 6,166,638 A | 12/2000 | Brady et al. | |
| 6,332,098 B2 | 12/2001 | Ross et al. | |
| 6,496,806 B1 | 12/2002 | Horwitz et al. | |
| 6,600,418 B2 | 7/2003 | Francis et al. | |
| 6,669,089 B2 * | 12/2003 | Cybulski et al. ............ | 235/385 |
| 6,703,935 B1 | 3/2004 | Chung et al. | |
| 6,750,771 B1 | 6/2004 | Brand | |
| 6,788,204 B1 | 9/2004 | Ianelli et al. | |
| 6,809,703 B2 * | 10/2004 | Serra .......................... | 343/895 |
| 7,036,734 B2 | 5/2006 | Baker | |
| 7,121,457 B2 | 10/2006 | Michal, III | |
| 7,151,979 B2 | 12/2006 | Andersen et al. | |
| 7,155,304 B1 | 12/2006 | Charych | |
| 7,221,269 B2 | 5/2007 | Onderko et al. | |
| 7,233,241 B2 | 6/2007 | Overhultz et al. | |

(Continued)

FOREIGN PATENT DOCUMENTS

NL           9401836           6/1996

*Primary Examiner*—Daryl C Pope
(74) *Attorney, Agent, or Firm*—Hogan & Hartson, LLP (57) ABSTRACT

The present invention provides an antenna for reading RFID tags in a material handling environment. At least one ruggedized, upward-looking antenna is mounted on the fork (or other base-level platform) of a pallet jack or pallet truck. The antenna can be configured to read RFID tags on pallets that are loaded on the pallet jack and communicate the tag information to a warehouse management system.

29 Claims, 8 Drawing Sheets

U.S. PATENT DOCUMENTS

| | | |
|---|---|---|
| 7,236,851 B2 | 6/2007 | Charych |
| 7,243,476 B2 | 7/2007 | Schneider |
| 2002/0130817 A1 | 9/2002 | Forster et al. |
| 2004/0102870 A1 | 5/2004 | Andersen et al. |
| 2005/0052281 A1 | 3/2005 | Bann |
| 2005/0076816 A1* | 4/2005 | Nakano .................. 108/51.11 |
| 2005/0200457 A1* | 9/2005 | Bridgelall et al. .......... 340/10.3 |
| 2006/0058913 A1 | 3/2006 | Andersen et al. |
| 2006/0132312 A1 | 6/2006 | Tavormina |
| 2006/0208893 A1 | 9/2006 | Anson et al. |

* cited by examiner

PALLET JACK ANTENNA FOR RFID SYSTEM

CROSS REFERENCE TO RELATED APPLICATIONS

This application claims priority under 35 U.S.C. § 119(e) from U.S. Provisional Patent Application Nos. 60/680,925, filed on May 13, 2005, and 60/718,947, filed on Sep. 20, 2005, both of which are incorporated herein by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

This invention relates generally to antenna systems, and more particularly to mobile wireless data collection systems.

2. Description of Related Art

Current "best practices" employed in the movement and tracking of goods in warehouses and distribution centers include the use of barcode-based data collection and wireless networked computers on lift trucks and other mobile material handling equipment. While these technologies have greatly enhanced the efficiency and accuracy of warehousing operations over recent decades, they still fundamentally rely on manual data collection activity in the validation of material movement. Two aspects are key elements to enhance efficiency.

One aspect is automated data collection needs to be synchronized with operator directives and activity. Operators are typically presented with instructions from the warehouse management software application on the screen of a mobile wireless computer on the lift truck. Upon completion of the required action, the operator typically enters data through a bar code scan or keyboard entry to confirm accurate completion of the task. The information is transmitted over a wireless connection to the application on a network server. The application may then assign the operator the next task. Thus, the application and process require real-time, precise data, appropriate to the task and synchronous with operator actions and application instructions.

The second aspect is that almost all full pallet load moves require two basic data collection elements: (1) load identification and (2) location identification. If, for instance, a lift operator is instructed to drive to a particular location, he may then be required to scan a bar code on a particular rack or shelf to verify that he has arrived at the correct location. If he is then directed to pick up a pallet, he may then be required to scan a bar code on the pallet load to identify the load to the application software. A subsequent instruction to deposit the load at a particular location would typically be followed by a bar code scan identifying the deposit location to validate task compliance.

The use of radio frequency identification (RFID) technology presents great promise for automating the data collection process. A RFID system typically uses a RFID tag reader to query a RFID tag attached to an object. The RFID tag provides certain information associated with the tagged object.

Prior attempts to effectively implement RFID technology in a warehouse environment have typically failed to fully take into account the aspects mentioned above. For example, the use of RFID "portals" at dock doors in warehouses is typically intended to deliver identification of the load passing through the portal and to designate the location (dock door) identification through the reader's network address. However, this is seldom synchronized with lift operator instructions and application instructions to the operator. Also, the attractive characteristic of RFID as a solution approach is that it can be automated easily and does not require "line of sight" to identify items or locations. RFID systems can, and typically do, read multiple tags; but this often results in extraneous data, which fails to deliver discrete, precise data as required by the application. Thus, the use of RFID systems in warehouse inventory control presents a unique set of problems that have to be resolved to ensure efficient operation of the RFID system.

To be successful for use in a warehouse inventory control, the RFID-based solution should address the first and second aspects above. A key to the first aspect will be that the RFID implementation becomes inherently part of the synchronized activities of the lift operation itself. A key to the second aspect will be that the RFID implementation collects precisely the data expected and required at each step of the lift operation.

With specific reference to warehouse inventory control, the RFID system has to efficiently operate in a harsh operating environment that is typical of a warehouse. RFID tag readers are installed at various locations in the warehouse. Some of these locations are stationary mounting locations, such as that of a RFID tag reader installed on a post located adjacent to a conveyor belt. Other locations are mobile mounting locations, such as that of a RFID tag reader installed on a pallet jack or pallet truck. One particular function of the RFID tag reader mounted on the pallet jack is to communicate with RFID tags attached to various objects transported by the pallet jack.

Mounting the RFID tag reader upon a pallet jack involves several operational as well as logistical considerations. Consequently, prior to installation of the RFID tag reader, an acceptable mounting location has to be identified such that installation and operation of the RFID tag reader will not interfere with, nor be affected by, the operation of the pallet jack. Particularly, antennas for communicating with RFID tags should be mounted in a manner that addresses multiple factors.

For example, in some instances, a limited signal strength is required to prevent reading of undesired adjacent RFID tags. Thus, there may be a need to mount antennas for the RFID reader at the front area of the pallet jack. Furthermore, signal strength requirements may vary for particular applications or types of inventory packaging. Antennas should be located in a manner to improve probability of a correct tag read for numerous inventory types and power requirements.

Another factor is the rugged environment of warehouse operations and mobile material handling equipment. An antenna must have an adequate structure and/or secured location to withstand this rugged environment. However, the ruggedized antenna structure, should still accommodate typical pallet jack operations, including use of pallets with standard-sized openings. In some applications it may be preferable to retrofit existing pallet moving equipment with RFID-capable equipment or to provide other cost-effective means of incorporating RFID.

RFID tag alignment can present another factor. When RFID tags are improperly aligned or partially obscured, an interrogating antenna may not be able to read the RFID tag.

Thus, to improve tag read rates, there may be a need for multiple antennas to project signals from different positions relative to tags on the pallet. Depending on the interrogating antenna and tag locations, improved read rates may also be possible through the use of particularly polarized signal patterns. In some environments pallet jacks incorporate double-length (or longer) tines for carrying two (or more) sets of pallets. It would be desirable to automatically and effectively read both sets of pallets and to distinguish between the two sets.

Today, commercial RFID technology operates at ultra-high frequencies (UHF) or microwave frequencies using backscatter coupling techniques. Antenna systems that can support these frequencies, while meeting the above needs are required.

SUMMARY OF THE INVENTION

The present invention provides an antenna for reading RFID tags in a material handling environment. At least one ruggedized, upward-looking antenna is mounted on the fork (or other base-level platform) of a pallet jack or pallet truck. The antenna can be configured to read RFID tags on pallets that are loaded on the pallet jack and communicate the tag information to a warehouse management system.

The fork-mounted antenna may incorporate any of several designs that allows for transmission of upward-looking RFID signals. The designs can be accommodated within standard pallet jack fork dimensions and can be incorporated as OEM design or retrofit. In the present invention, the antenna's structure and location on the pallet jack forks permit use of focused low-level RF power, which helps to ensure accurate reading of RFID tags on the pallets being loaded without reading unintended nearby tags. Multiple antennas may be mounted on a single fork to provide required coverage for double-length fork.

In one embodiment the invention provides an antenna system for interrogating radio frequency identification (RFID) tags with backscatter coupling techniques. The antenna is suitable for mounting on the fork of a pallet jack and includes a pallet jack fork with a top surface, a cut-out in said top surface, and two side surfaces. The top and side surfaces form an internal channel under the pallet jack fork. An antenna is mounted in the internal channel and a cover is mounted in the cut-out essentially flush with the top surface, so as to permit a radiating element to project a radio frequency signal from the cut-out in an essentially upward direction.

BRIEF DESCRIPTION OF FIGURES

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the particular embodiments of the present invention, examples of which are illustrated in the accompanying drawings.

Figure 1:
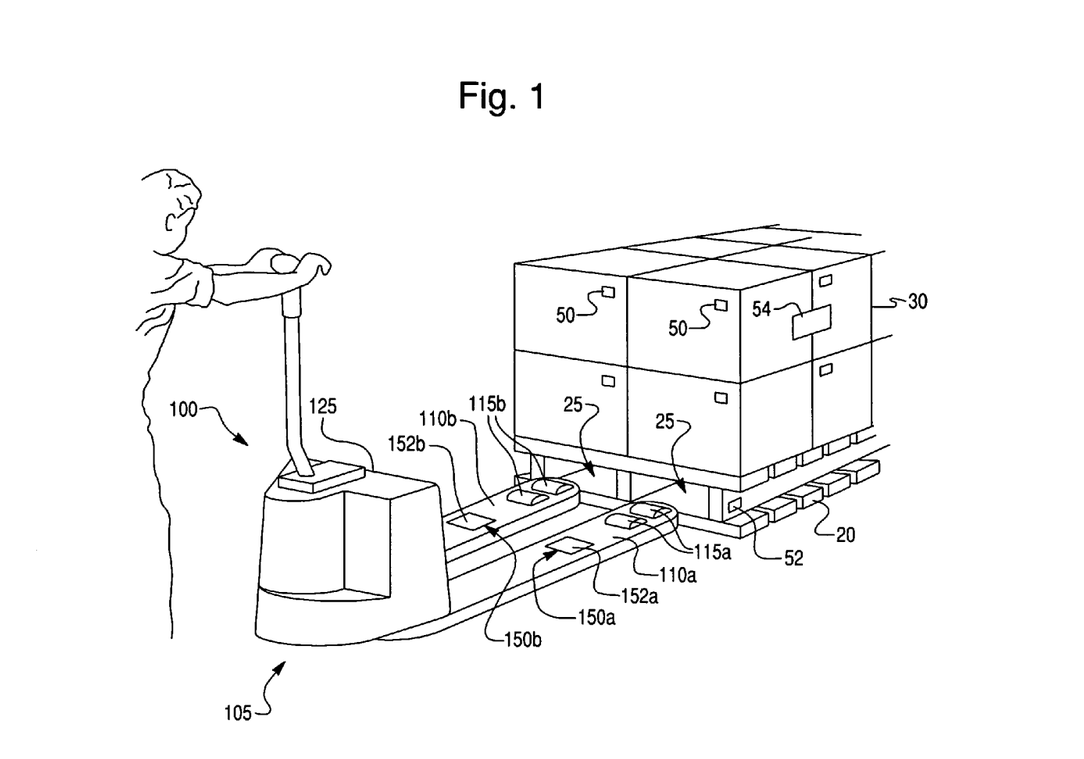
FIG. 1 provides a schematic of a RFID tag read scenario using a pallet jack according to an embodiment of the invention.

FIG. 1 provides a perspective view of a pallet jack 100, suitable for use with embodiments of the present invention. The pallet jack 100 shown is a motorized hand pallet jack. However, numerous other types of pallet jacks are contemplated with embodiments of the present invention. For example, a manual hand pallet jack, pallet truck, rider pallet truck, or platform truck may also be used. The pallet jack 100 includes a pair of forks 110a, 110b that are affixed at one end to the carriage area 105. The other end of forks 110a, 110b are supported by front wheels 115a, 115b, respectively. The front wheels 115a, 115b, are mounted inside the end of the forks 110a, 110b and extend to the floor. The forks 110a, 110b typically slide under a pallet 20 that holds inventory 30. More particularly, the pallet jack slides into pallet openings 25, where the pallet jack forks 110a, 110b are slightly elevated to lift the pallet 20. The pallet 20 is lifted enough to clear the floor for subsequent travel.

Pallet 20 and/or inventory 30 may include radio frequency identification ("RFID") tags to identify inventory contents. A variety of pallet tags may be used to provide redundancy for an inventory control system. For example, as shown in FIG. 1, RFID tags 50 are included on each of the packaged inventory containers 30. RFID tag 52 is included on the actual pallet 20. Additional pallet tags (not shown) may be embedded in the actual pallet or on a non-visible surface of the pallet 20. Also, a unit load tag (or serialized shipping container code tag) 54 may be provided. The unit load tag 54 is typically applied over a group of inventory 30 that may be secured together (via shrink-wrap, for example). By associating (in, for example, a database) the inventory container tags 50, pallet tags 52, and unit load tags 54 when the pallet 20 is loaded, the entire pallet contents can be recognized at a later time by reading any single one of the tags 50, 52, 54. Forks 110a, 110b include RFID antennas 150a, 150b that interrogate radio frequency identification (RFID) tags with backscatter coupling techniques. The main structure of each fork 110a, 110b is generally formed from a single piece of steel or other strong material that is formed to create a downward facing C-shape along the length of the fork. Other shapes or cross-sections may be used where the general design criteria involves an acceptable strength-to-weight characteristic and often there are hollow portions beneath the top surface in contact with the load. Thus, as will be shown in more detail in subsequent figures, the fork has an internal channel inside the C-shape in which to house components for antennas 150a, 150b. Cut-outs in the surface of forks 110a, 110b provide a location for each antenna 150a, 150b. Each antenna 150a, 150b may include a dielectric cover 152a, 152b essentially flush with the top of the fork 110a, 110b to protect internal components. The cover 152a, 152b is generally an abrasion-resistant and impact-resistant material. Some exemplary (and non-limiting) materials include Delrin®, Lexan®, ultra-high molecular-weight polyethylene (UHMWPE), other polycarbonates, and/or fiberglass-filled epoxy. As will be discussed in more detail with respect to particular embodiments disclosed herein, the covers 152a, 152b may also serve as a support structure for the antenna components.

When the antennas 150a, 150b are placed within range of the RFID tags 50, 52, 54 (e.g., when the pallet jack 100 is positioned under the pallet 20), the antennas 150a, 150b enable communication between the RFID tags 50, 52, 54 and reader electronics 125 located in the carriage area 105 of the pallet jack 100. The antennas 150a, 150b may operate at a variety of frequencies such as, for example, ultra-high frequencies ("UHF") in the range of 800-1000 MHz or microwave frequencies in the range of 2.4-2.5 GHz. The short wavelengths of these frequency ranges facilitate the construction of antennas with smaller dimensions and greater efficiency than would be feasible using lower frequency ranges (e.g., below 30 MHz). In some embodiments, the power level for the antennas 150a, 150b may be adjusted to provide the ideal signal range to read desired pallet tags without reading unwanted tags in a nearby vicinity.

Figure 2A:
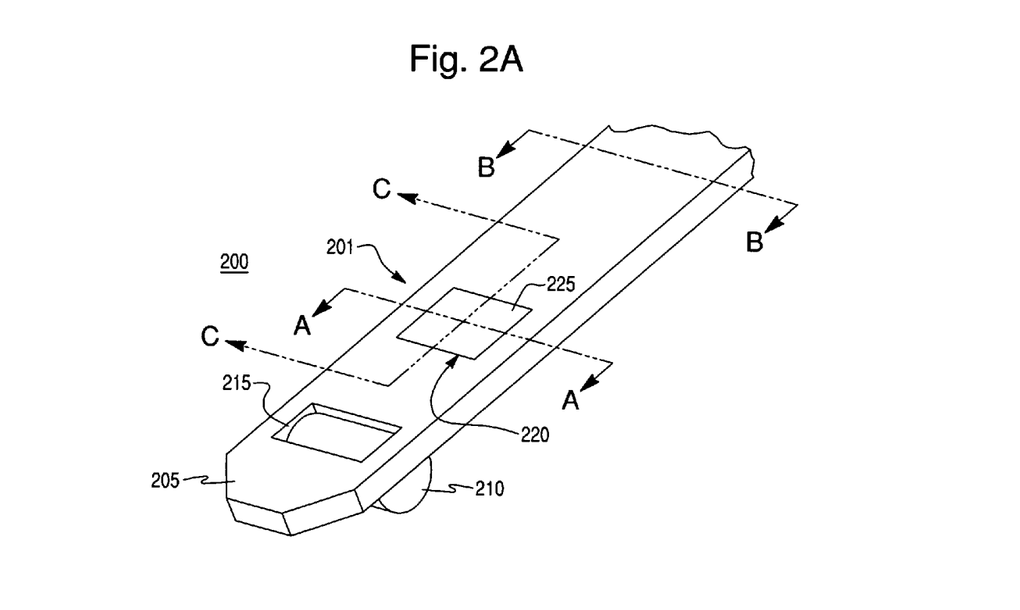
FIG. 2A provides a top perspective view of an embodiment of a pallet jack fork with an integrated patch antenna.
Figure 2B:
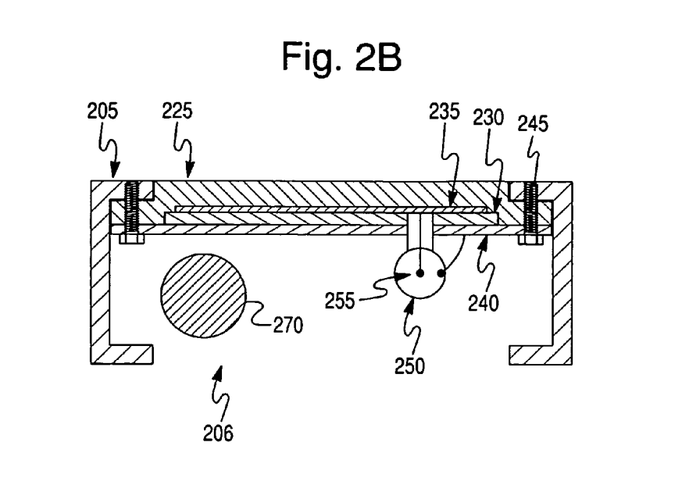
FIG. 2B provides a cross-section along A-A of the pallet jack fork of FIG. 2A.
Figure 2C:
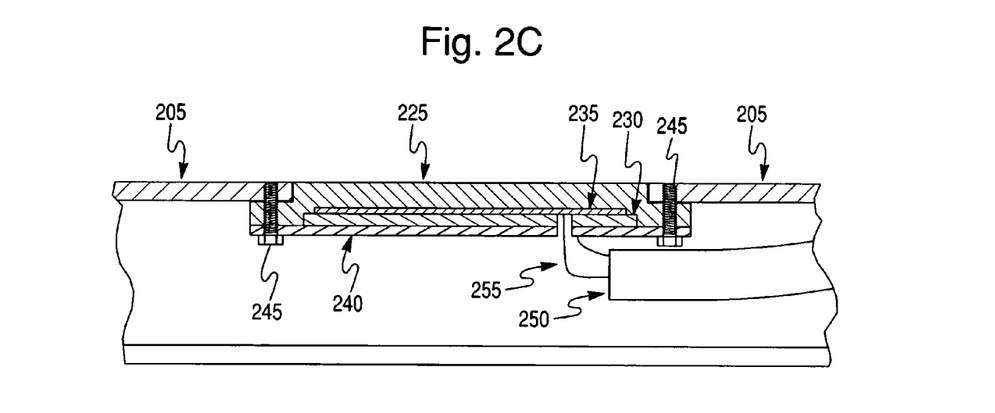
FIG. 2C provides a longitudinal cross-section along C-C of the pallet jack fork of FIG. 2A.
Figure 2D:
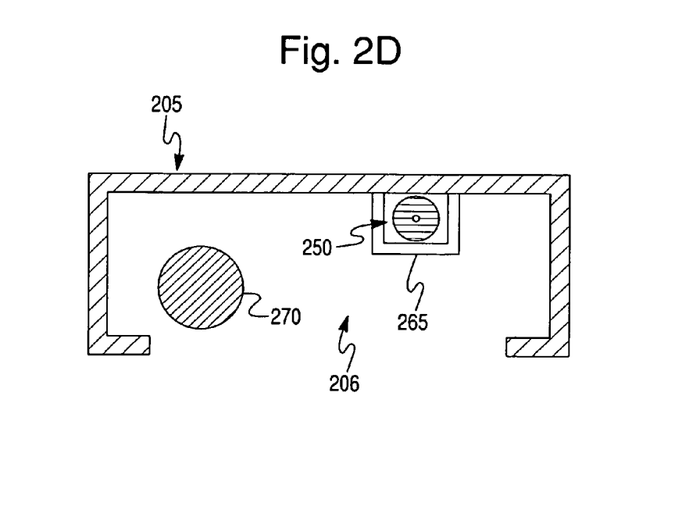
FIG. 2D provides a cross-section along B-B of the pallet jack fork of FIG. 2A.

FIG. 2A provides a perspective view of a section of pallet jack fork 200 including a patch antenna 201 in one embodiment of the present invention. FIGS. 2B, 2C, and 2D provide various cross sectional views of the fork 200. Fork 200 includes a steel frame 205 that is supported in part by a wheel 210. The height of the frame 205 is adjustable. Frame 205 includes a cut-out or aperture on its top surface to form wheel gap 215 that allows the height of the frame 205 to be lowered, so that the total height of the fork may be no more than that of the wheel 210. Frame 205 also includes a cut-out or aperture 220 for the purpose of mounting a patch antenna 201. In the embodiment of FIG. 2A, the cut-out 220 is filled by a cover 225 for the patch antenna. It is understood that the cover 225 may be a part of the antenna assembly and may be bondably attached or otherwise directly integrated with the antenna. As discussed above with respect to the more generic cover 152a, 152b of FIG. 1, the cover may be made of a dielectric material that is both impact resistant and abrasion resistant. The cutout 220 is sized according to the requirements of the antenna 201, and generally is limited in size by requirements to maintain the structural integrity of the frame 205 with or without the cover 225 installed.

The cross-sectional views of FIGS. 2B, 2C, and 2D—which provide views of the mounted patch antenna 201 components—will be discussed collectively. FIG. 2B provides cross-section along A-A of the pallet jack fork of FIG. 2A, and FIG. 2C provides a longitudinal cross-section along C-C of the pallet jack fork of FIG. 2A. FIG. 2D provides a cross-section along B-B of the pallet jack fork of FIG. 2A. The C-shape of steel frame 205 creates an open, downward-facing channel 206 within the fork 200. The channel 206 houses the patch antenna 201 components and a rod 270 that spans generally from the carriage to the wheel 210 to control the wheel 210 height. Cover 225 is shown mounted within cut-out 220 of frame 205. Underneath the cover 225 is a printed circuit board (PCB) 230 holding antenna [radiating] element 235. Underneath the PCB 230, a ground plane/support plate 240 is provided. The support plate may be made of any conductive material with sufficient strength to support and/or protect the other components. Screws 245 mechanically attach the support plate 240 and cover 225 to the steel frame 205. As an alternative to screws 245, bolts, rivets, structural adhesives, or other mechanical fastening means may be used to secure the antenna 201 components securely to the frame 205. The PCB 230 may be mechanically held in place by the compressive force of the installed cover 225 and ground plane 240, as well as the shape of the cover 225 around the PCB 230. Alternatively, the PCB 230 may be bonded to either the cover 225 or the ground plane 240. While a PCB 230 is shown in the figures, other ways of mounting the antenna element 235 are contemplated. For example, the antenna element may be mounted directly to the bottom of the cover 225.

The antenna 201 may be circularly polarized using, for example, a square-shaped microstrip patch for antenna element 235. It is understood that other symmetric or near-symmetric microstrip patch elements can support or produce circular polarization. These shapes may include truncated shapes such as a square shape with one pair of corners located along a diagonal relative to a feed point location can produce and support circular polarization. Near-circular or elliptical polarization may also be used with or without truncation features. Typically, RFID tags tend to be linearly polarized. Thus, the use of an antenna with polarization other than linear polarization increases the probability of a successful RFID tag read regardless of alignment of the RFID tag. However, linear polarization may also be effectively used with a single fork antenna. Read rates of RFID tags in certain material handing environments may be further increased by using a plurality of differently-oriented polarized antennas on a single pallet fork, or using differently-oriented antennas on different pallet jack forks. In other embodiments multiple cut-outs or apertures and radiating elements may be fed using a single transmission line to provide a plurality of signal orientations. Furthermore, the cut-out or aperture may be elongated to accommodate a distributed antenna structure such as a traveling wave type antenna element. Hence, discrete antenna elements and distributed antenna elements are within the scope of the present invention.

In the embodiment shown in FIGS. 2B-E, power for the antenna element 235 is provided by a feed cable 250. The center conduit 255 of the feed cable 250 extends through an insulated (not shown) path in the ground plane 240 to connect to the antenna element 235 on the PCB 230. The feed cable 250 is operatively coupled to, for example, a RFID reader system 125 (FIG. 1) located in the carriage area 105 (FIG. 1) of the pallet jack. The feed cable 250 may be supported along the length of channel 206 by one or more support brackets 265. The power distribution configuration of FIGS. 2B-D is one of several options that may be used with embodiments of the present invention. The feed cable 250 may be coupled to the antenna element 235 by any conventional means, such as a coaxial connector or other socket. Other power distribution or RF transmission line configurations may replace cable 250 with, for example a strip line mounted on a insulated substrate or a planar waveguide that extends the necessary length of the channel 206 from the antenna 201 back to the end of the fork at the carriage area.

The thickness of the patch antenna 201 should generally be less than the depth of the interior channel 206 of the fork 200. However, the antenna 201 may be thicker than the depth of the interior channel 206 if the antenna is sufficiently protected to withstand typical impact or if the operation of the pallet jack is not otherwise limited in its particular operating environment. As will be understood by one skilled in the art, particular dimensions required for the cut-out 220, the cover 225, the PCB 230, the antenna element 235, and the support plate 240 will vary with particular material choices and selected antenna properties, such as the desired operational frequency. Generally, a typical thickness of the antenna 201 when installed may be about 0.50 to 0.75 inch. As shown in FIGS. 2B and 2D, for example, pallet jack forks typically include a rod 270 that extends along the channel 206 to provide mechanical force to raise/lower the leading end of the fork 200 over the wheel 210. (The rod 270 is removed from FIG. 2C for clarity.) In some conventional pallet jack forks, there may be sufficient clearance between the rod 270 and the frame 205 to install the antenna 201 without modification to the rod 270 location. Other configurations may include decreasing the size of the patch antenna (to the extent permitted by the required operating frequencies), lowering the rod 270 and/or relocating the rod 270 to the extreme left or right of the channel 206.

Figure 2E:
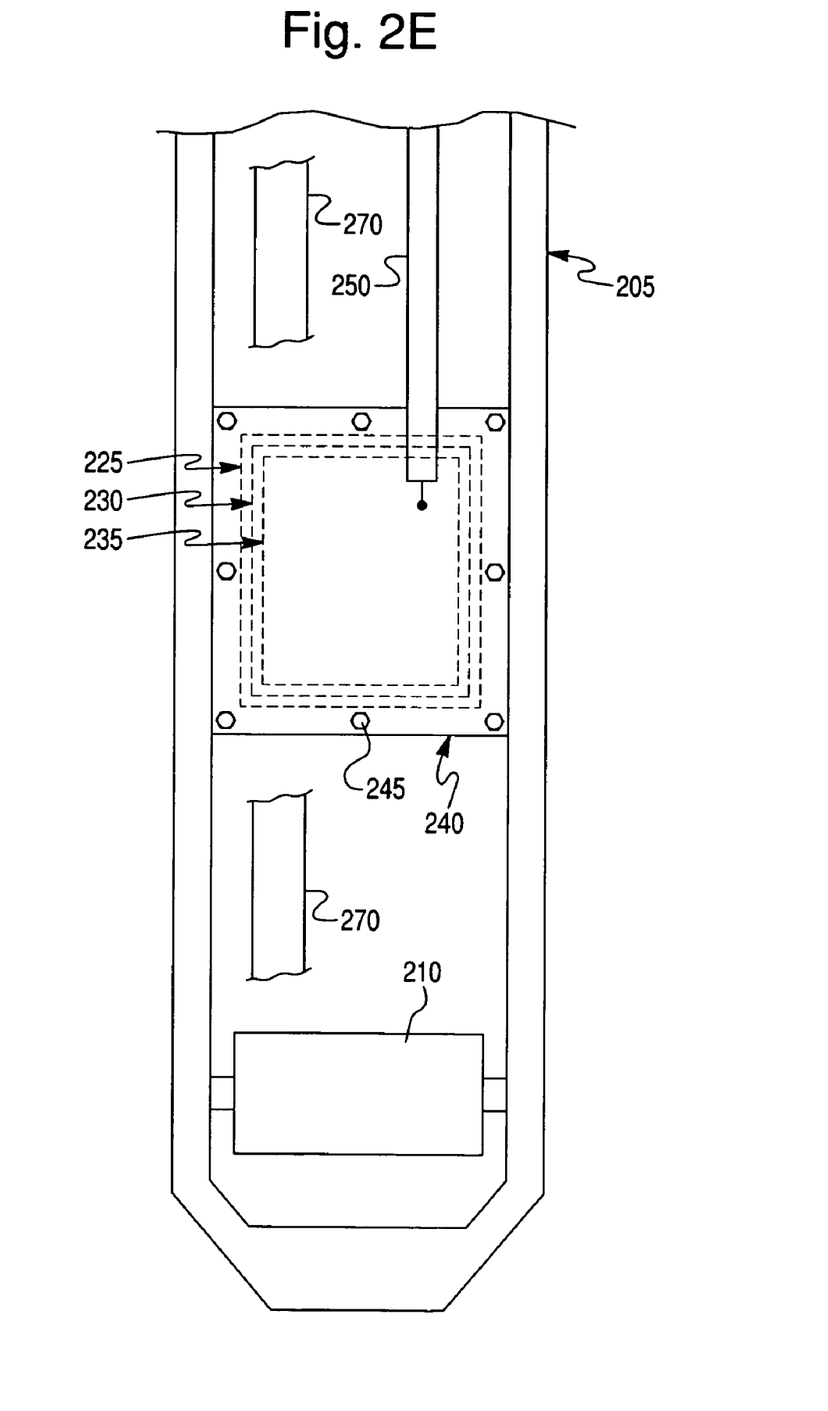
FIG. 2E provides a bottom view of the pallet jack fork of FIG. 2A.

FIG. 2E provides a bottom view of the pallet jack fork of FIG. 2A in one embodiment. Rod 270 is shown cut-away for clarity. The support plate 240 covers and protects the other components (e.g., PCB 230 and antenna element 235) of the antenna 201 from foreign objects. Mounting screws 245 secure the support plate 240 to the underside of frame 205.

Figure 3A:
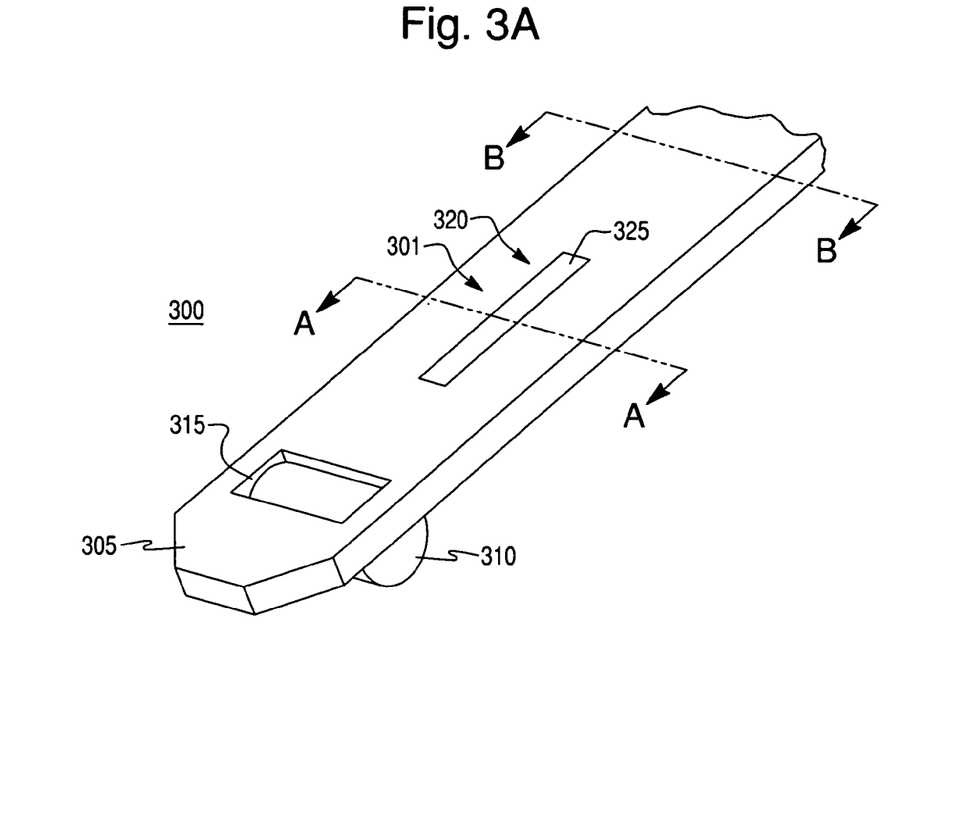
FIG. 3A provides an top perspective view of an embodiment of a pallet jack fork with an integrated slot antenna.
Figure 3B:
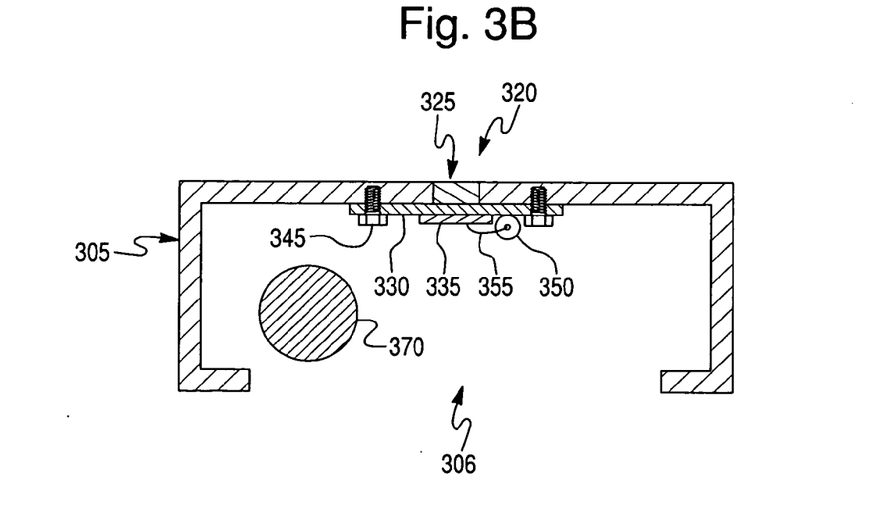
FIG. 3B provides a cross-section along A-A of the pallet jack fork of FIG. 3A.
Figure 3C:
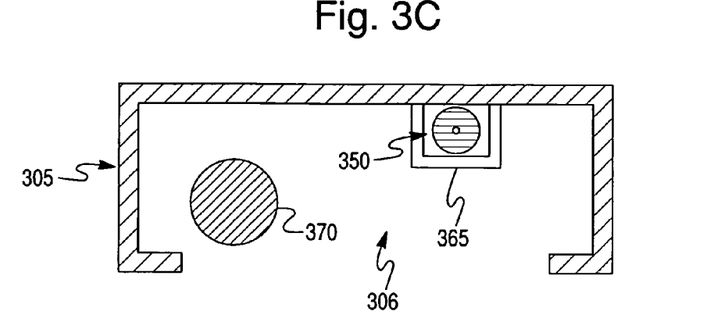
FIG. 3C provides a cross-section along B-B of the pallet jack fork of FIG. 3A.

FIG. 3A provides a top perspective view of an embodiment of a pallet jack fork 300 with an integrated slot antenna 301 in one embodiment of the present invention. FIGS. 3B and 3C provide cross sectional views of the fork 300 along lines A-A and B-B, respectively. Fork 300 includes a steel frame 305 that is supported in part by a wheel 310. The height of the bottom of the frame 305 above the floor is adjustable. Frame 305 includes a cut-out on its top surface to form wheel gap 315 that allows the height of the frame 305 to be lowered, so that the overall height of the fork above the floor may be no more than that of the wheel 310. Frame 305 also includes a cut-out in the form of a slot 320 that serves as a radiator for integrated slot antenna 301. In the embodiment of FIG. 3A, the slot 320 is filled with a dielectric cover 325. As discussed above with respect to the more generic cover 152a, 152b of FIG. 1, the cover is made of a dielectric material that is both impact resistant and abrasion resistant.

The cross-sectional views of FIGS. 3B and 3C provide views of the slot antenna 301 components and will be discussed collectively. FIG. 3B provides a cross-section along line A-A of the pallet jack fork of FIG. 3A; and FIG. 3C provides a cross-section along line B-B of the pallet jack fork of FIG. 3A. The squared C-shape of steel frame 305 creates an open, downward-facing channel 306 within the fork 300. The channel 306 houses the slot antenna 301 components and a rod 370 that controls the height of the frame 305 above wheel 310. Slot cover 325 is shown mounted within cut-out slot 320 of frame 305 and flush with the top surface. The cover may be formed by allowing a castable liquid dielectric to solidify or a solid cover material may be mounted by conventional mechanical techniques. Below the slot 320 is a printed circuit board (PCB) 330 on which is mounted feed circuit element 335. The PCB 330 is positioned so that the feed circuit element 335 radiates RF energy through the slot 320. Screws 345 mechanically attach the PCB 330 to the steel frame 305. As an alternative to screws 345, bolts, rivets, structural adhesive, or other mechanical fastening means may be used to secure PCB 330 to frame 305. While a PCB 330 is shown in the figures, other ways of mounting the antenna element 335 are contemplated. For example, the antenna element may be mounted directly to the bottom of slot cover 325.

Below the PCB 330, an optional support plate may be provided. In contrast with the patch antenna described with respect to FIGS. 2A-E, a ground plane is not required for slot antenna 301 because the steel frame 305 is at DC ground. While the frame 305 is described as a steel frame (the typical material for pallet jack forks), the frame 305 may be made of any conducting material that has a substantially uniform voltage distribution across the frame at low frequency. An optional support plate (not shown) may be included to provide protection for antenna 301 components. The optional support plate may be attached to the frame 305 in a variety of ways, including those discussed with respect to the support plate 240 of FIG. 2B.

The slot antenna 301 is linearly polarized. In contrast with circular polarization discussed above with respect to FIG. 2A-E, an antenna that linearly polarized in a single direction may have a smaller probability of achieving a successful RFID tag read for some tag orientations. However, read rates may be increased by using a plurality of differently-oriented linearly polarized antennas either on the same fork or using differently-oriented antennas on different pallet jack forks. In one embodiment, for example, two slot antennas may be positioned near each other on the same fork, with a first slot at a +45° angle and a second slot at a −45° angle relative to the longitudinal direction of the fork. In another embodiment, a single slot on one fork may be included at a +45° angle relative to the longitudinal direction of the fork, while a second fork may have a single slot at a −45° angle. It is understood and within the scope of the present invention that a plurality of slot radiators may be configured and fed in a manner to produce a circular or elliptical polarization. One example is a crossed slot pair generally oriented to provide orthogonal or near orthogonal linear polarizations and fed with equal or nearly equal amplitudes and quadrature (90°) phase relative phase values.

In the embodiment shown in FIGS. 3B-C, power for the feed circuit element 335 is provided by a feed cable 350. The center conduit 355 of the feed cable 350 connects to the feed circuit element 335 on the PCB 330. The feed cable 530 is operatively coupled to, for example, a RFID reader system 125 (FIG. 1) located in the carriage area 105 (FIG. 1) of the pallet jack. The feed cable 350 may be supported along the length of channel 306 by one or more support brackets 365. Bracket 365 is one exemplary way to support feed cable 350. Other bracket configurations may be used, or other support methods (such as, for example, adhesives) may be used. The power distribution shown in the embodiment of FIGS. 3B-C is one of several options that may be used with embodiments of the present invention. The feed cable 350 may be coupled to the feed circuit element 335 by any conventional means, such as a coaxial connector or other socket. Embodiments with other power distribution configurations are contemplated in which cable 350 may be replaced, for example, with a strip line mounted on a insulated substrate that extends the necessary length of the channel 306 from the antenna 301 back to the end of the fork 306 at the carriage area.

As with the embodiment of FIGS. 2A-E, the thickness of the slot antenna 301 in FIGS. 3A-D should generally be less than the depth of the interior channel 306 of the fork 300, unless additional protection for the antenna elements is provided. As will be understood by one skilled in the art, particular dimensions of the slot 320, the slot cover 325, the PCB 330, and the feed circuit element 335 will vary with particular material choices and selected antenna properties. Generally, a typical thickness of the antenna 301 when installed may be about 0.50 to 0.75 inch.

Figure 3D:
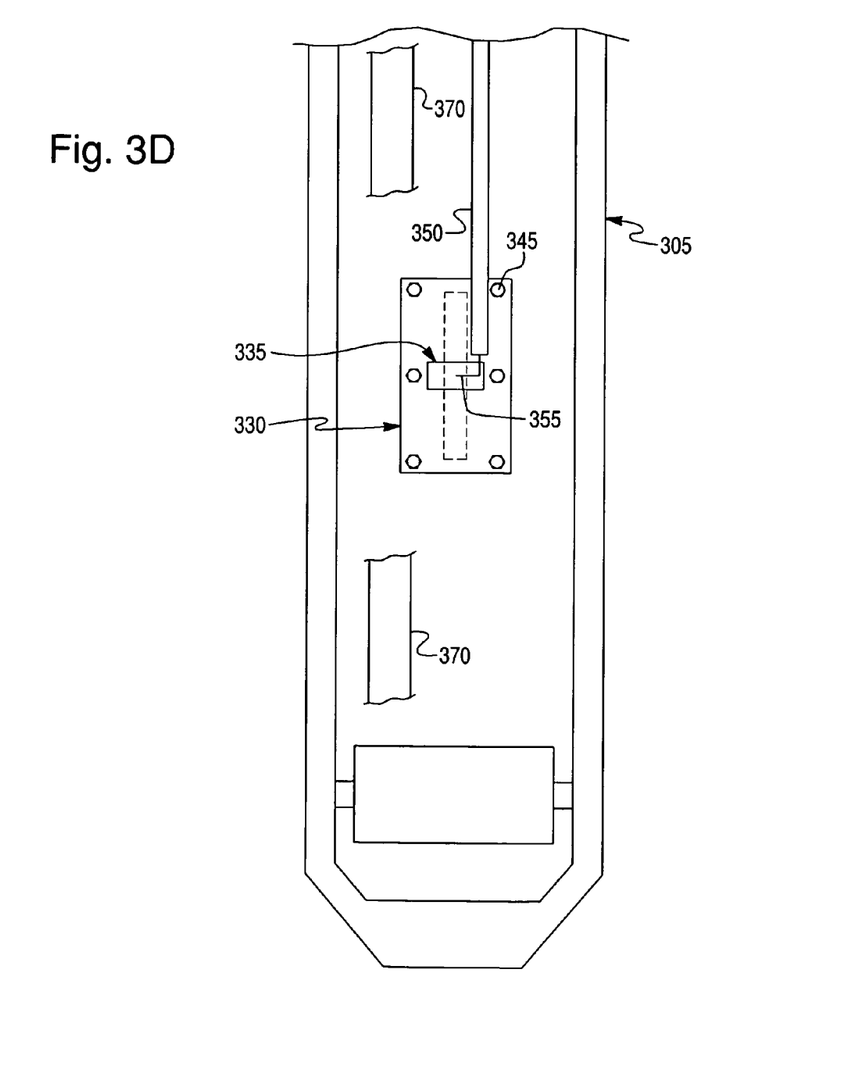
FIG. 3D provides a bottom view of the pallet jack fork of FIG. 3A.

FIG. 3D provides a bottom view of the pallet jack fork of FIG. 3A in one embodiment. Rod 370 is shown cut-away for clarity. The optional support plate is not included, so as to reveal the other elements of antenna 301, including the PCB 330 that supports the feed circuit element 335. Mounting screws 345 secure the PCB 330 to the underside of frame 305 so as to position the feed circuit element 335 across the slot 320.

Figure 4:
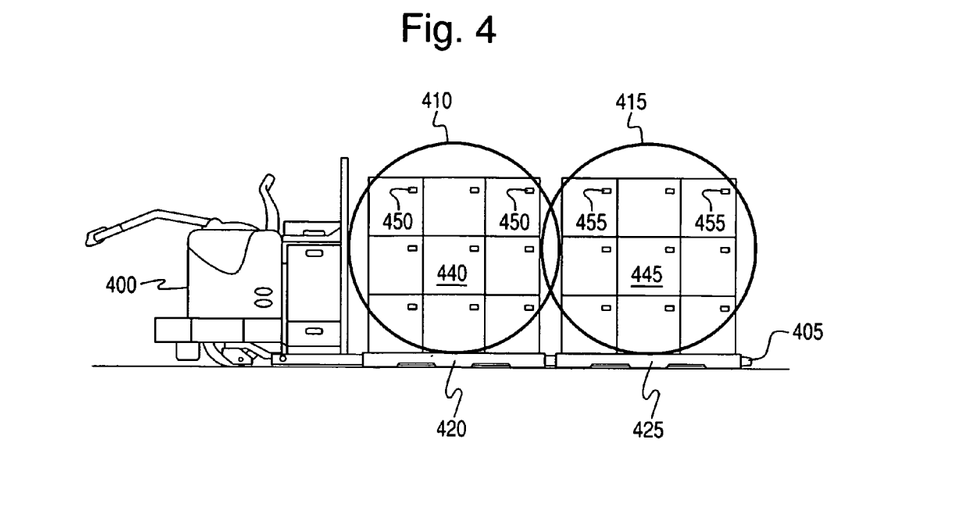
FIG. 4 provides a side view of a pallet jack with double-length forks having integrated RFID antennas.

FIG. 4 shows a side view of a pallet jack 400 that includes a fork 405 with two antennas (not visible) mounted therein. The pallet jack 400 holds two pallets 420, 425 each containing packaged inventory 440, 445 labeled with RFID tags 450, 455 to identify the inventory contents. A first antenna projects a signal 410 to read one or more of the RIFD tags 450 on the inventory 440. A second antenna projects a signal 415 to read one or more of the RIFD tags 455 on the inventory 445. In the embodiment of FIG. 4, the mounted antennas permit a RFID reading system to identify the inventory of each pallet 420, 425 uniquely, including the location of each pallet 420, 425 on the pallet jack. In some embodiments, the power level of each antenna may be adjusted (either as a pre-set value or varied in real-time) to the minimum level necessary to identify a single tag. As previously noted, a single inventory tag, pallet tag, or unit load tag may be used to identify an entire pallet by prior association in a database of a warehouse management system.

A second fork (not visible in FIG. 4) on the pallet jack 400 may be similarly equipped with interrogating antennas to provided redundancy and to increase the probability of a successful tag read. The antennas on each fork may be symmetrically spaced or offset. Also, the antennas on one fork may be of a different type than on the other fork. For example, a patch antenna (with circular polarization) may be included on one fork, while a slot or dual-slot antenna (with linear polarity) may be included on the opposite fork. The different types of antennas, in some environments, may increase the probability of a successful RFID tag read. In other embodiments, the patterns 410 and 415 may be configured to overlap to improve the likelihood of a successful RFID tag read for a single pallet. For example, while the embodiment shown in FIG. 4 shows two pallets 420, 425, a single double-length pallet may also be used with the antenna configuration illustrated. Two or more antennas may be located on a single- or double-length tine.

Figure 5A:
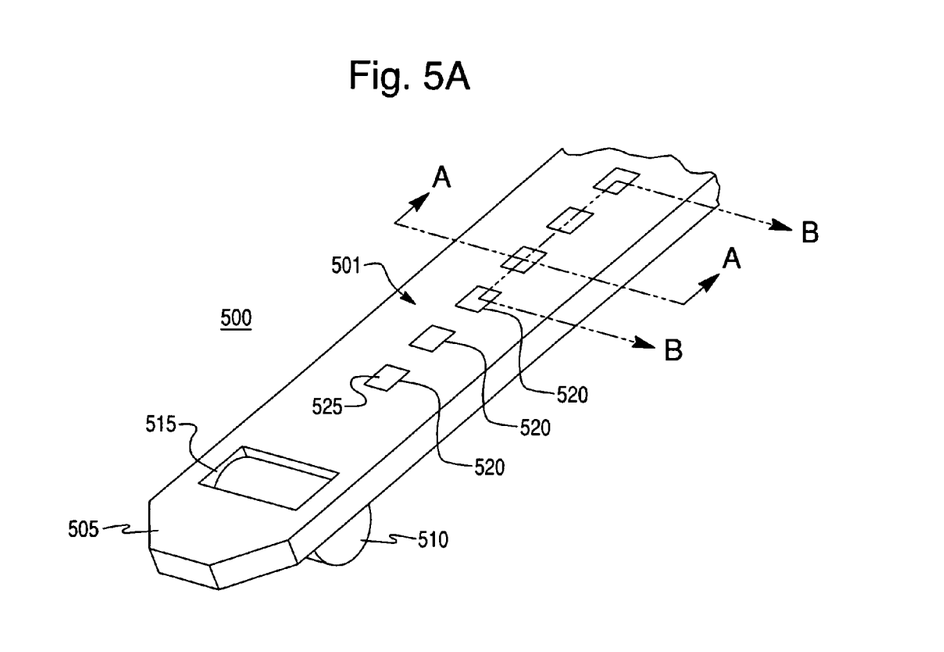
FIG. 5A provides a top perspective view of an embodiment of a pallet jack fork with an integrated leaky waveguide antenna.
Figure 5B:
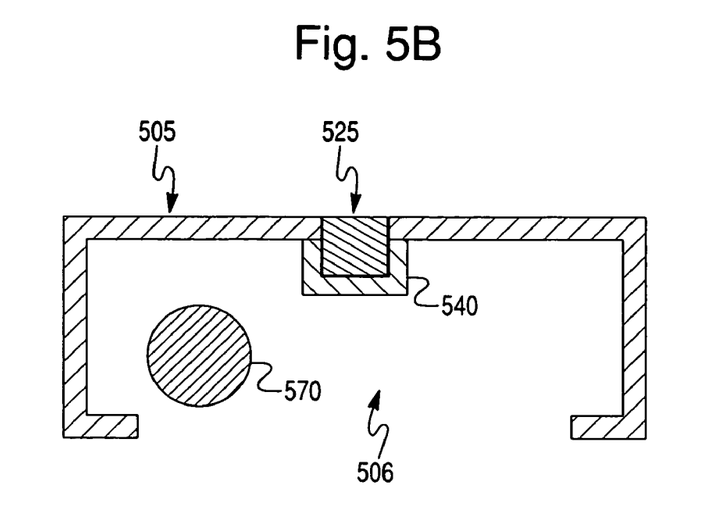
FIG. 5B provides a cross-section along A-A of the pallet jack fork of FIG. 5A.
Figure 5C:
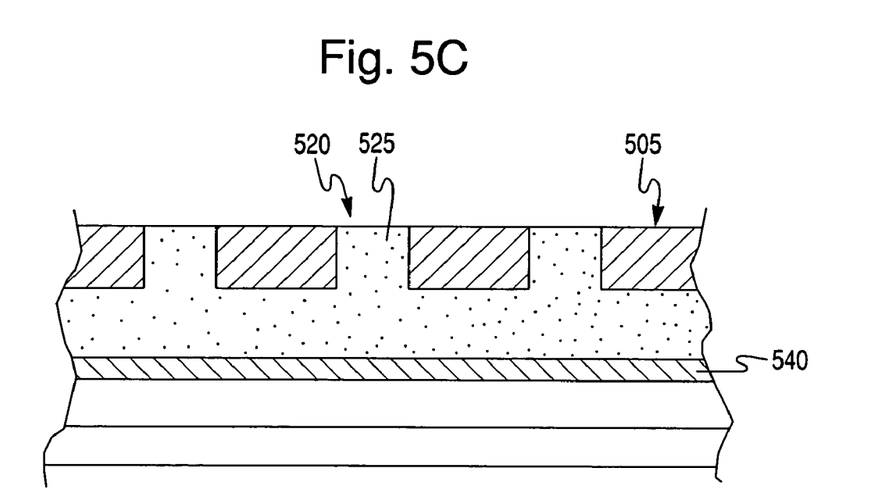
FIG. 5C provides a longitudinal cross-section along B-B of the pallet jack fork of FIG. 5A.

FIG. 5A provides a top perspective view of a section of a pallet jack fork 500 including a leaky waveguide antenna 501 in one embodiment of the present invention. FIG. 5B provides a cross-sectional view of the fork 500 along section A-A of FIG. 5A. FIG. 5C provides a cross-sectional view of the fork 500 along section B-B of FIG. 5A. The structure of the fork 500 and its frame 505 is similar to that described with respect to FIGS. 2A-E. The frame 505 includes a series of cut-outs 520 which serve as RF emission points for the leaky wave antenna 501. In the embodiment of FIG. 5A-C, a leaky waveguide channel 540 is formed under the cut-outs 520 so that RF energy travels through the channel 540 and is projected through each of the cut-outs 520. The channel 540 may be filled with a dielectric material 525 to prevent debris from falling into channel 540. The dielectric material 525 should be both impact resistant and abrasion resistant. Referring to FIG. 5C, the channel 540 is completely filled with dielectric material 525. The dielectric material 525 may also be included only as a cover for the slot, with the remainder of the channel 540 being filled with air or another material. RF energy may be fed into the channel 540 at one end using a power distribution network (not shown), such as a coaxial cable, strip line or other conventional transmission line or guiding medium to propagate RF energy through the channel 540. As is understood in the art, the channel 540 size and particular spacing of cut-outs 520 are governed by factors such as the antenna frequency and the type of dielectric material 525 used. Although multiple cut-outs 520 are shown in FIG. 5A-C, any number of cut-outs—including a single cut-out—may be used. Also any number of multiple, discrete radiating elements may be included in the channel 540. In a larger channel 506 formed by frame 505, a rod 570 spans generally from the carriage of the pallet truck (not shown) to the wheel 510 to control the height of the pallet fork 500.

Figure 6:
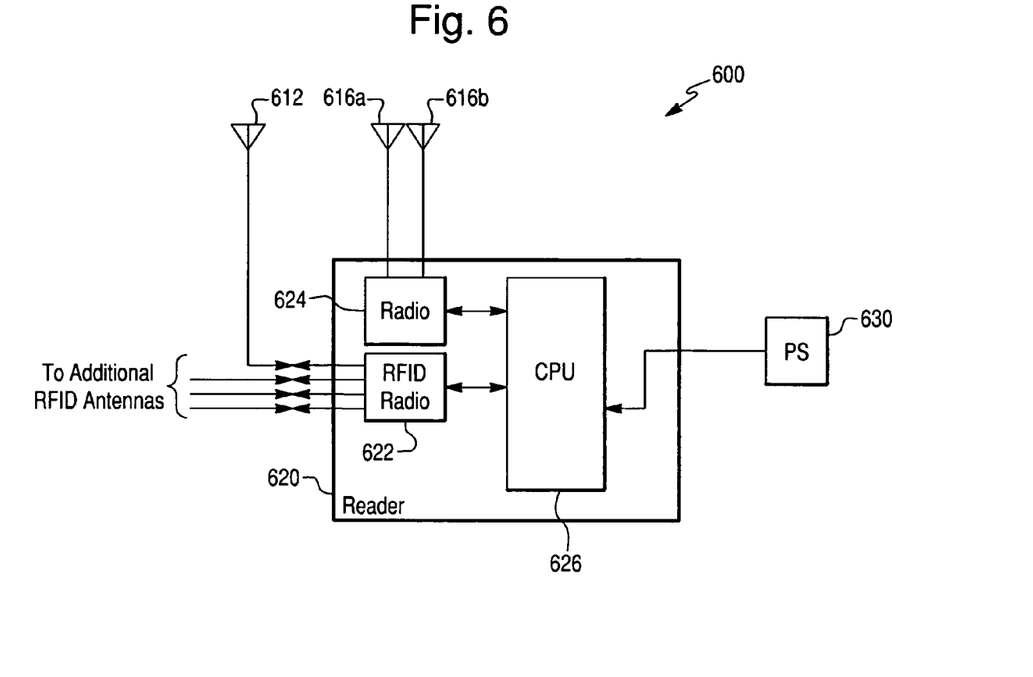
FIG. 6 provides an electrical system block diagram of a RFID system mounted on a pallet jack.

FIG. 6 provides an electrical system block diagram for a forklift-mounted communication system 600 utilizing an antenna system according to embodiments of the present invention. Ruggedized antenna 612 may be mounted, for example, on the fork of a pallet truck. The communication system 600 may also include, for example, wireless network antennas 616a, 616b. Other antenna combinations are also contemplated within the scope of embodiments of the present invention. The RFID antenna 612 is operatively connected to a RFID radio transceiver 622; while the wireless network antenna 616 is operatively connected to a wireless communications radio (e.g., an IEEE standards 802.11 radio) 624. The radio transceiver 622 and communications radio 624 may be housed with or otherwise operatively connected to a central processing unit (CPU) 626 in a RFID reader 620. Signals from the RFID antenna 612 are transmitted through the RFID radio transceiver 622 to the CPU 626. The CPU 626 interprets the RFID signal and transmits information to a warehouse or inventory management system (not shown) via wireless network radio 624 and antennas 616a, 616b. The CPU 626 may also contain a power source 630 for the radio transceiver 622 and communications radio 624, which could be from a separate battery, a re-chargeable battery, or the forklift's battery. The power level of the RFID antenna 612 and/or reader 620 may be adjusted to suit particular applications. The reader 620 may be located, for example, on the carriage area of a forklift. The power supply 630 from, for example, the forklift battery provides power for the communication system 600.

Figure 7:
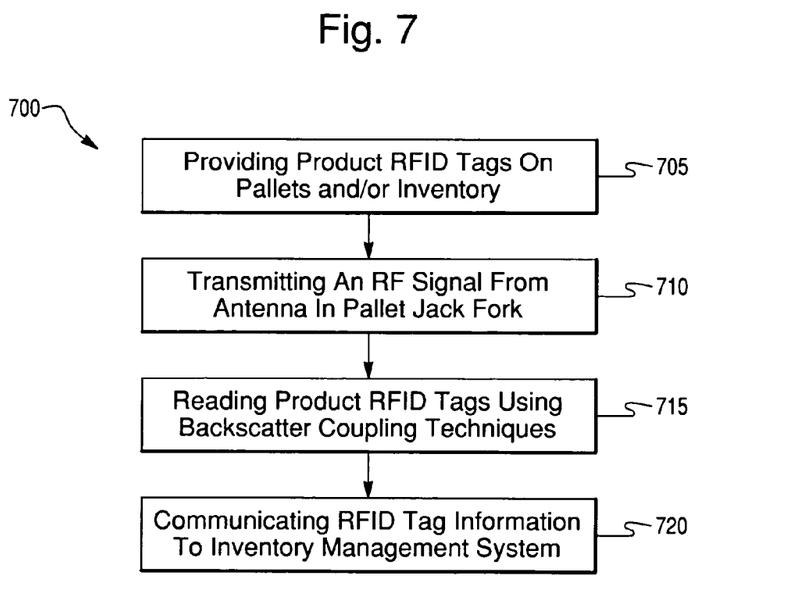
FIG. 7 provides a flow chart of a method of collecting inventory tracking data in material handling environment using an integrated pallet jack fork antenna according to an embodiment of the invention.

FIG. 7 provides a flow chart of a method 700 of collecting inventory tracking data in material handling environment using an integrated pallet jack fork antenna according to an embodiment of the invention. The method 700 includes a step 705 of providing product RFID tags on one or more pallets and/or the inventory on the pallets. The product RFID tags represent inventory contents. In step 710, the pallet jack fork is placed under the pallet and emits a RF tag interrogating signal from one or more antennas in the pallet jack fork. The RF signal may be transmitted from the pallet jack antenna in a predominantly upward direction. The RF signal may be in the functional range of about 900 MHz (800 to 1000 MHz) or about 2.4 GHz (2.4-2.5 GHz) or even about 5.7-5.8 GHz. In some embodiments, the antenna signal may be circularly polarized; while other embodiments may use a linearly polarized signal or a combination of differently polarized signals. Next, in step 715, the information from the product RFID tags is read using backscatter coupling techniques. In cases where more than one pallet is being carried and the pallets are next to each another, the pallet jack fork may be configured so that least one antenna may be located under each pallet. By separately tracking each RF antenna signal, each pallet may be uniquely identified by the RFID reader. Finally, in step 720, the method 700 includes the step of communicating the RFID tag information to an inventory management system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. An antenna system for interrogating radio frequency identification (RFID) tags with backscatter coupling techniques, said antenna suitable for mounting on the fork of a pallet jack, comprising:
    a pallet jack fork, said pallet jack fork including a top surface, a first cut-out in said top surface, and two side surfaces, wherein said top and side surfaces form an internal channel;
    an antenna mounted in said internal channel, said antenna comprising a radiating element and a power distribution network;
    a cover mounted in said cut-out essentially flush with said top surface, so as to permit said radiating element to project a first radio frequency signal from said cut-out in an essentially upward direction.

2. The antenna system of claim 1, wherein the first radio frequency signal is in the functional range of about 800 to 1000 MHz.

3. The antenna system of claim 1, wherein the first radio frequency signal is in the functional range of about 2.4 to 2.5 GHz.

4. The antenna system of claim 1, wherein the antenna system has an adjustable power level and the power level is adjusted to allow for accurate RFID tag reading in different applications.

5. The antenna system of claim 1, wherein a combined thickness of the antenna and cover is no more than a height of said side surfaces.

6. The antenna system of claim 1, wherein the cover is an abrasion-resistant and impact-resistant dielectric material.

7. The antenna system of claim 1, wherein said projected first radio frequency signal is circularly polarized.

8. The antenna system of claim 1, further comprising:
    a second cut-out in said top surface;
    a second antenna mounted in said internal channel, said second antenna comprising a second radiating element;
    a second cover mounted in said second cut-out essentially flush with said top surface, so as to permit said second radiating element to project a second radio frequency signal from said second cut-out in an essentially upward direction.

9. The antenna system of claim 8, wherein said pallet jack fork is configured to hold a first pallet essentially adjacent to a second pallet and said first cut-out and said second cut-out are spaced apart on said top surface so that said first radio frequency signal is projected from under the first pallet and said second radio frequency signal is projected from under the second pallet.

10. The antenna system of claim 8, wherein said first radio frequency signal and said second radio frequency signal are independently controlled by a RFID reader.

11. The antenna system of claim 1, further comprising a RFID reader mounted on said pallet jack and operatively connected to said antenna.

12. The antenna system of claim 1, wherein said antenna is a patch antenna and said patch antenna further comprises a support structure for said radiating element.

13. The antenna system of claim 12, wherein said cover serves as said support structure.

14. The antenna system of claim 12, further comprising a second radiating element operatively coupled to said radio frequency transmission line to form an array.

15. The antenna system of claim 1, wherein said antenna is a slot antenna, said cut-out being in the form of a slot and said pallet jack fork being made of conducting material having a substantially uniform voltage distribution across the fork surface at a low frequency.

16. The antenna system of claim 15, further comprising a second cut-out in the form of a slot, said second cut-out oriented so as to be non-parallel to said first cut-out.

17. The antenna system of claim 16, wherein said first cut-out and said second cut-out are oriented at a 90 degree angle respective to each other.

18. The antenna system of claim 1, wherein said antenna is a leaky waveguide antenna, said antenna further comprising a waveguide channel with said cut-out providing an opening for said waveguide channel.

19. The antenna system of claim 1, wherein said antenna is one or more of a patch antenna, a slot antenna, and a leaky waveguide antenna.

20. A method of collecting inventory tracking data in material handling environment using an integrated pallet jack fork antenna, said method comprising the steps of:
    providing product RFID tags on a pallet and inventory on at least one of the pallet, wherein the product RFID tags represent inventory contents;
    transmitting an RF signal from an antenna mounted in an internal channel of the pallet jack fork, wherein said internal channel is formed by a top surface and two side surfaces of said pallet jack fork; and
    reading information from the product RFID tags using backscatter coupling techniques.

21. The method of claim 20, further comprising the step of communicating the RFID tag information to an inventory management system.

22. The method of claim 20, wherein the radio frequency signal is in the functional range of about 800 to 1000 MHz.

23. The method of claim 20, wherein the radio frequency signal is in the functional range of about 2.4 to 2.5 GHz.

24. The method of claim 20, wherein the RF signal is transmitted from the antenna in a predominantly upward direction.

25. The method of claim 20, wherein said antenna has circular polarization.

26. The method of claim 20, wherein a plurality of antennas are located on the pallet jack and 1 to N pallets are provided and each of said 1 to N pallets is uniquely identified by one or more of said antennas.

27. An antenna system for interrogating radio frequency identification (RFID) tags with backscatter coupling techniques, said antenna suitable for mounting on the fork of a pallet jack, comprising:

a pallet jack fork, said pallet jack fork including a top surface, a two or more cut-outs in said top surface, and two side surfaces, wherein said top and side surfaces from an internal channel;

an antenna mounted in said internal channel at each cut-out, each of said antennas comprising a radiating element and a power distribution network;

a cover mounted in each of said cut-outs, said cover being essentially flush with said top surface, so as to permit each of said antennas to project a radio frequency signal from said cut-out in an essentially upward direction.

28. The antenna system of claim 27, wherein said pallet jack fork is of a length sufficient to accommodate two or more adjacent pallets and wherein each of said antennas is essentially aligned under one pallet.

29. The antenna system of claim 28, wherein each of said antennas communicate independently with a RFID reader.

* * * * *